(12) United States Patent
Ueno

(10) Patent No.: US 7,234,675 B2
(45) Date of Patent: Jun. 26, 2007

(54) VERTICAL GUIDE UNIT AND STAGE SYSTEM WITH THE SAME UNIT

(75) Inventor: Naoaki Ueno, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 180 days.

(21) Appl. No.: 10/741,447

(22) Filed: Dec. 22, 2003

(65) Prior Publication Data

US 2004/0129856 A1    Jul. 8, 2004

(30) Foreign Application Priority Data

Dec. 20, 2002    (JP) .............................. 2002-369751

(51) Int. Cl.
    *F16M 1/00*    (2006.01)
    *F16C 29/06*   (2006.01)
(52) U.S. Cl. .................... 248/668; 248/657; 384/45
(58) Field of Classification Search ............... 248/657, 248/660–664, 668–669, 157, 419, 420, 429, 248/430, 649–656, 677, 188.4; 384/43–45
    See application file for complete search history.

(56) References Cited

U.S. PATENT DOCUMENTS

| 3,439,581 | A | * | 4/1969 | Wilkins ........................ 91/55 |
| 4,114,845 | A | * | 9/1978 | Weisenberger ............... 248/615 |
| 4,168,927 | A | * | 9/1979 | Moyer ......................... 408/130 |
| 4,296,974 | A | * | 10/1981 | Teramachi ..................... 384/45 |
| 4,475,776 | A | * | 10/1984 | Teramachi ..................... 384/45 |
| 4,838,515 | A | * | 6/1989 | Prentice ....................... 248/661 |
| 4,858,865 | A | * | 8/1989 | Schrepfer ................. 248/188.2 |
| 5,076,714 | A | * | 12/1991 | Teramachi ..................... 384/45 |
| 5,249,867 | A | * | 10/1993 | Iida .............................. 384/45 |
| 5,427,349 | A |   | 6/1995 | Obrecht |
| 5,676,038 | A | * | 10/1997 | Hosono et al. .......... 92/165 PR |
| 6,443,619 | B1 | * | 9/2002 | Dutsch ......................... 384/45 |
| 2004/0129856 | A1 | * | 7/2004 | Ueno .......................... 248/637 |

FOREIGN PATENT DOCUMENTS

| JP | 53042/1994 | 7/1994 |
| JP | 2505894    | 5/1996 |
| JP | 48064/1999 | 2/1999 |

* cited by examiner

*Primary Examiner*—Carl D. Friedman
*Assistant Examiner*—Tan Le
(74) *Attorney, Agent, or Firm*—Browdy and Neimark, PLLC

(57) ABSTRACT

A vertical guide unit is built in modular construction in which a wedge guideway member has raceway grooves cut directly in guideway member while a slider fits over the guideway member for relative movement in a sliding manner. The guideway member has an upper surface extending slantwise with respect to a horizontal lower surface and the raceway grooves are cut slantwise on at least widthwise opposing sides near the upper surface of the guideway member. The slider is recessed at the middle thereof to have widthwise opposing wings to fit over the guideway member for sliding movement. The vertical guide unit is built in between a bed and a table to provide a stage system in which the table is allowed to go up and down as the slider moves in and out relatively to the guideway member.

5 Claims, 6 Drawing Sheets

VERTICAL GUIDE UNIT AND STAGE SYSTEM WITH THE SAME UNIT

FIELD OF THE INVENTION

The present invention relates generally to a vertical guide unit adapted for use in a variety of machinery including, for example semiconductor manufacturing machines, precision measuring instruments, precision inspection equipment, precision assembly machines, industrial robots or the like to allow any work, instrument, and so on to go up and down for performing machining process, assembly, inspection, and so on and to a stage system having aboard the same unit.

BACKGROUND OF THE INVENTION

Modern advanced machines such as semiconductor manufacturing machines are becoming more reliant on a multi-stage system in which an X-Y stage is allowed to move in both an X-direction and a Y-direction in a horizontal plane also has aboard a Z stage that can go up and down in a Z-direction perpendicular to the horizontal plane. Correspondingly, the Z stages of the sort recited just above are seeing growing demands for high precision travel, with even made slim or compact in construction and tough in stiffness. Besides being used for a work table of a machine tool to make vertical position-control of any workpiece carried on the work table, the Z stage unit like this one stated earlier is now built in a diverse machines including semiconductor manufacturing machines, assembly machines, inspection instruments, conveyor systems, and so on. The Z stages are now finding increased applications as the technology advances. Moreover, the Z stages are used in a way mounted on the X-Y stage systems to provide three-dimensional position-control stage systems.

A prior vertical position-control like the Z stage stated earlier is disclosed in, for example, Japanese Patent Laid-Open No. 48064/1999 in which a slantwise platform is mounted on top of the horizontal table and there are provided a linear motion guide unit having a first guide rail to move the horizontal table relatively to a machine base and another linear motion guide unit having a second guide rail lying on a inclined surface of the slantwise platform to get the Z stage to go up and down as the horizontal table moves.

The prior vertical position control as recited above, however, needs many parts or components, plenty of time to assemble every part into a stage unit, and also not only increases in stage dimensions but is not quite good enough to comply with the demand for highly precise position-control in years.

Another prior art of the vertical position-controls is disclosed in, for example Japanese Utility Model laid-Open No. 53042/1994, in which a ball screw- and lead nut arrangement is employed to get a table system going up and down. The system table can move in a vertical direction with the help of a slantwise surface. The table system is composed of a machine base, a first table mounted on top of the machine base for movement in a horizontal plane and made inclined on a top face thereof, a motor to drive the first table, a second table installed for movement along the inclined face of the first table, another motor to force the second table, a lead nut mating with a first ball screw, the lead nut being secured to a bottom of the first table having the inclined surface on the top thereof, and a second ball screw mounted on the inclined surface to move up and down the second table.

With the prior table system constructed as recited earlier, the lead screws are provided for tables, one to each table, to get the tables moving back and forth with carrying the loads thereon. This prior art, because of needing two driving mechanisms to be built therein, results in increasing overall height of the table system. Moreover, it would be tough to ensure the lead screws enough in stiffness to carry whole load with making certain of steady position-control and travel of the tables. This means that the prior table system as recited above would be unsuited for the worktable in the machine tools, which need precise position-control in machining operations. Thus, such table systems, although less in number of parts or components and ready for carrying some relatively lightweight instruments, could not be expected to make certain of precise position-control when carrying any heavy instruments because the lead screws are exposed to directly stand up to the heavy load, and therefore would be limited in their use.

Disclosure of U.S. Pat. No. 5,427,349 teaches an adjustable base assembly in which an upper wedge plate assembly is raised or lowered with using a vertical adjustment screw including left and right threaded portions, like a turnbuckle. With the prior base assembly recited above, a pair of wedge blocks is flanked by the upper and lower wedge plates, with their upper wedge faces coming into sliding engagement with the downwardly converging faces of the upper wedge plate while their lower wedge faces coming into sliding engagement with the upwardly converging faces of the lower wedge plate. Turning the screw moves the wedge blocks towards or away from each other to raise or lower the upper wedge plate relative to the lower wedge plate.

The base assembly so constructed as to rely on surface-to-surface sliding engagement stated earlier is not ready for demands on highly precise position-control and also fails to manage delicate operations.

A double linear guide system is known as disclosed in, for example Japanese Utility Model Registration No. 2505894, in which the guide rail is provided with four raceway grooves extending lengthwise in parallel with one another. With the double linear guide system cited above, first and second sliders fit over the guide rail, which has on widthwise opposing sides thereof four raceway grooves extending lengthwise in parallel with one another. The double linear guide system can not find its way in the vertical position-control because the sliders are allowed to move only in parallel with one another. Other Z stage system is known, in which there is provided a slantwise base with V-shaped raceway grooves on sides thereof, which is pinched by a pair of track pieces to undergo prestress to be guided. However, the Z stage of the sort stated earlier, because of needing to prepare a pair of track pieces separately, is large in number of the required parts or components and correspondingly harder to assemble them, having to go through troublesome process of attempting to get alignment to make sure of precision on assembly.

SUMMARY OF THE INVENTION

The present invention, therefore, has as its primary object to overcome the major problems discussed earlier in the vertical guide unit and, in particular to provide a vertical guide unit in which a guideway member is made simplified in construction to help reduce the desired number of parts or components, and a stage system having aboard the vertical guide unit of a modular construction. With the vertical guide unit of the present invention, the guideway member having raceway grooves cut directly in crosswise opposing sides thereof is made in a wedge to provide a slantwise guideway surface extending in longitudinal direction, the guideway member being carried on a machine bed either against or for movement relative to the bed, while a slider fits over and conforms to the guideway member so as to go up and down as an actuator causes the guideway member to move in and out relatively to the slider.

The present invention is concerned with a vertical guide unit; comprising a guideway member made with first raceway grooves, a slider made with second raceway grooves in opposition to the first raceway grooves, the slider being movable in sliding manner relatively to the guideway member, and a rolling element allowed to roll through a raceway defined between the first and second raceway grooves; wherein the guideway member is made in a wedge that has a lower surface and an upper surface extending in a longitudinal direction slantwise with respect to the lower surface, the guideway member being provided directly on widthwise sides thereof with the first raceway grooves extending slantwise with respect to the lower surface, and the slider is made to have widthwise opposing wings in which the second raceway grooves are made, whereby the slider fits over the guideway member for sliding movement to move up and down the guideway member.

In an aspect of the present invention, there is provided a vertical guide unit in which any number of the slider rides on the upper surface of the guideway member.

In another aspect of the present invention, there is provided a vertical guide unit in which the guideway member has either a substantially rectangular configuration or a substantially I-shape extended sidewise at both the upper surface and the lower surface, when taken along any crosswise direction normal to the longitudinal direction, and the slider fits over the upper surface of the guideway member for sliding movement with respect to the guideway member.

In another aspect of the present invention, there is provided a vertical guide unit in which the slider is made in the form of either a substantially rectangular configuration where a top face thereof to provide a mounting surface on which is carried a carriage of any instrument extends in parallel with the upper surface of the guideway member or a wedge where the top face thereof extends in parallel with the lower surface of the guideway member.

In another aspect of the present invention, there is provided a vertical guide unit in which the guideway member is either secured directly or carried through a bearing to a stationary bed.

In another aspect of the present invention, there is a vertical guide unit in which the guideway member is made directly on sidewise opposing sides thereof with two raceway groove pairs, one extending along the upper surface and the other extending along the lower surface, and correspondingly, there are provided an upper slider movable along the upper surface and a lower slider movable along the lower surface, whereby the upper slider moves up and down the guideway member as moving in a sliding manner relatively to the guideway member.

In a further another aspect of the present invention, a vertical guide unit is provided in which any number of the slider rides on the upper surface and the lower surface of the guideway member, respectively.

In another aspect of the present invention, there is provided a vertical guide unit in which an arc tangent of a slope angle included between the lower surface and the first raceway grooves on the sides of the guideway member is equal to either ½ or ¼. Moreover, a vertical guide unit is disclosed in which the guideway member is made with a hole in which is installed an actuator to force the guideway member to move in and out.

In another aspect of the present invention, there is provided a vertical guide unit is disclosed in which the guideway member is either a substantially rectangular configuration or a substantially I-shape extended sidewise at both the upper surface and the lower surface, when taken along any crosswise direction normal to the longitudinal direction, and the upper slider fits over the upper surface of the guideway member for sliding movement relatively to the guideway member while the lower slider conforms to the lower surface of the guideway member for relatively sliding movement.

In another aspect of the present invention, there is provided a vertical guide unit in which the slider is comprised of a carriage and end caps attached to forward and aft ends of the carriage, one to each end, and wherein the carriage is recessed to fit over or conform to the guideway member, and provided on widthwise opposing insides thereof with the second raceway grooves and also made therein with return passages extending along the second raceway grooves to allow the rolling element to run through there and the end caps are each made therein with turnarounds allowing the rolling element to turn over through there.

The present invention is further concerned with a stage system having aboard the vertical guide unit comprising the guideway member made with pairs of the first raceway grooves cut directly in widthwise opposing sides thereof, one pair of which extends along the upper surface of the guideway member while the other pair lies along the lower surface thereof, respectively, an upper slider movable along the upper surface of the guideway member in sliding manner relatively to the guideway member, and a lower slider movable in sliding manner along the lower surface of the guideway member in sliding manner relatively to the guideway member, and further including a bed on which is secured the lower slider that makes engagement with the lower surface of the guideway member in a way allowed to slide relatively to the guideway member, a table lying above the bed to go up and down in vertical or Z-direction with respect to the bed and having the upper slider that comes into engagement with the upper surface of the guideway member for sliding movement relative to the guideway member, and an actuator to get the guideway member going in and out in a sliding manner relatively to the upper and lower sliders to force up and down the table in the Z-direction.

In another aspect of the present invention, a stage system is provided in which the actuator is comprised of a lead nut installed in the hole made in the guideway member, a ball screw mating with the lead nut and carried for rotation on the bed, and a driving means to turn the ball screw in reversible manner.

In another aspect of the present invention, there is provided a stage system in which the driving means to turn the ball screw in reversible manner is any one of a motor and a manually manipulated knob.

In another aspect of the present invention, there is provided a stage system in which the bed includes at least a bottom block to support the lower slider thereon against movement, and a side wall on which the ball screw is carried for rotation.

In another aspect of the present invention, there is provided a stage system constructed in which a linear motion guide unit is disposed between the side wall of the bed and the table, with a track rail thereof being fastened to the side wall while a slider thereof being secured to the table in a way riding on the track rail for vertical movement relatively to the track rail whereby the table is ensured to go smoothly up and down as the slider moves along the track rail.

In another aspect of the present invention, a stage system is provided in which any number of the vertical guide unit composed of the slider and the guideway member lies in opposed relation to one another in an X-direction along a horizontal X-axis, the opposed guideway members being first and second guideway members, and the actuator causes simultaneous movement of the guideway members in directions opposite to one another whereby the table goes up and down in the Z-direction.

In a further another aspect of the present invention there is provided a stage system in which the actuator is comprised of a lead nut-and-ball screw arrangement including a first lead nut installed in a hole made in the first guideway member, a second lead nut fit in a hole made in the second guideway member, and a ball shaft mating with the first and second lead nuts, with being carried for rotation on the bed, and a driving means to turn the lead shaft in reversible manner, and further wherein the first lead nut is cut with either one of right hand screw and left hand screw, while the second lead nut is cut with the other of right hand screw and left hand screw, and the ball shaft has external threads cut helically to mate with the first and second lead nuts.

According to the present invention, the vertical guide unit is made in a modular product in which the slider fits over or conforms to the wedge guideway member having raceway grooves that are cut directly in the widthwise opposing sides of the guideway member. Just taking aboard the modular vertical guide unit in operative relation to both the stationary bed and the table finishes the stage system. The stage system constructed as stated earlier allows the table to go up and down in vertical or Z-direction with no need of adjusting works including precise locating, pre-stress adjustment and so on, with even made more compact or slim compared with the conventional one. Thus, for example the Z stage system to get the slider moving up and down in the Z-direction can be assembled with compactness and stiffness enough to make sure of accurate movement of the table in vertical direction.

The stage system of the present invention is suited well for a variety of machines including, for example semiconductor manufacturing machines, precision measurement/ inspection instruments, assembly machines, and so.

With the vertical guide unit constructed as stated earlier, any number of sliders, for example a first slider and a second slider, fits over or rides on the wedge guideway member so as to get the first slider to go up and down in the Z-direction along the slope surface of the guideway member when the guideway member is forced in and out in the horizontal direction. Thus, the vertical guide unit of the present invention helps materialize the stage system in which the slider can move in the Z-direction over the slope of the guideway member, with even compactness, stiffness and accuracy.

With the vertical guide unit constructed as stated earlier, the wedge guideway member has the first raceway grooves that are cut directly along at least the upper surface extending slantwise, while the slider is recessed to form sidewise opposing wings inside which the second raceway grooves are cut, the slider riding on the upper surface of the guideway member for travel relative to the guideway member. Simple construction of the guideway member results in the reduction in number of parts and components, making the vertical guide unit itself into a modular construction, which helps keep the production cost less, renders the guide unit slim in construction with even high stiffness.

The stage system having aboard the vertical guide unit constructed as recited earlier is well suited for a variety of machines including, for example semiconductor manufacturing machines, precision measurement/inspection instruments, assembly machines, and so, which are needed to make certain of high accuracy in operation.

As an alternative, moreover, the table may be arranged to sit astride a pair of vertical guide units, which are arranged in opposed relation to one another, to force up and down heavy loads of a variety of objects including instruments, works, parts, and so on.

The stage system of the present invention may be made up by just laying the guideway member on the bed while mounting the table on the guideway member with no need of adjusting works including precise locating, pre-stress adjustment, and so on. The stage system, as able to be combined in various machines with ease and simple process, helps make the stage system, which is to move the table in the Z-direction, far slim or compact in construction compared with the conventional systems.

Other aspects, objects and advantages of the present invention can be obtained from a study of the drawings, the disclosure and the appended claims.

BEST MODE FOR CARRYING OUT THE INVENTION

Figure 1:
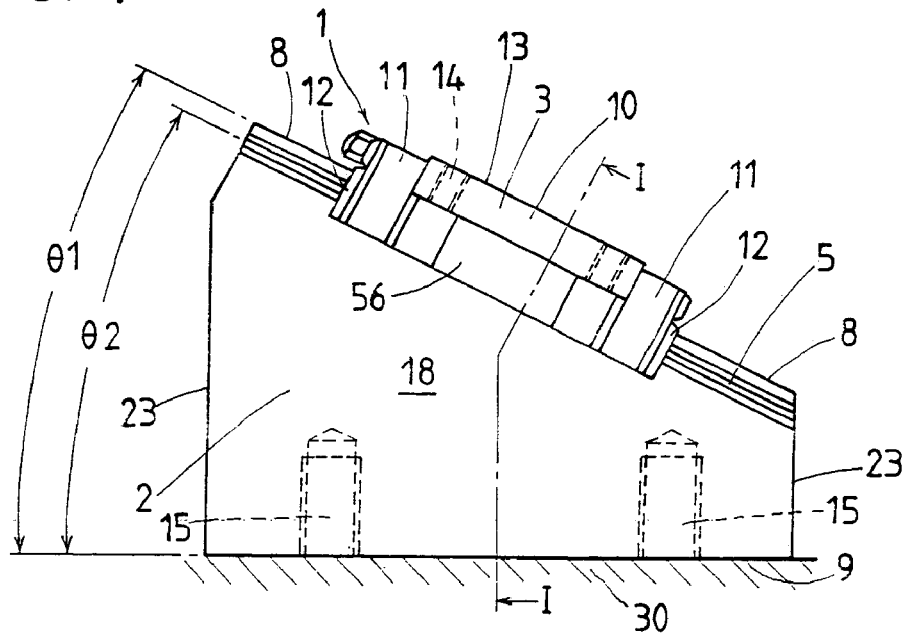
FIG. 1 is a front elevation showing a preferred embodiment of a vertical guide unit according to the present invention.

Embodiments of a vertical guide unit of the present invention and a stage system on board which is the vertical guide unit will be described in detail with reference to the accompanying drawings. The vertical guide unit discussed later is adapted for use in a variety of machinery including, for example semiconductor manufacturing machines, precision measuring machines, precision inspection equipment, precision assembly machines, and so on to provide a stage system in which any work or instrument is moved up and down in the Z-direction for a variety of processing steps including working, assembly, inspection, and so on.

First of all, preferred embodiments of the vertical guide unit of the present invention will be explained with reference to FIGS. 1 to 3.

A vertical guide unit 1 is mainly comprised of a guideway member 2 made with a first raceway groove 5, a slider 3 made with a second raceway groove 7 confronting the first raceway groove 5 to define a load raceway 55 between them, and more than one rolling element 20 allowed to run through the load raceway 55 with being held with a retainer band 17. The slider 3 fits over or conforms to the guideway member 2 to move in and out relative to the guideway member 2 by virtue of rolling contact with the rolling elements 20.

The guideway member 2 is made in the form of wedge defined by a horizontal bottom or lower surface 9 extending lengthwise of crosswise opposing sides 18 and a slantwise upper surface 8, which extends askew in relation to the lower surface 9. The guideway member 2 is provided with the raceway grooves 5, which are cut directly in crosswise opposite sides of the guideway member 2, one to each side, in a way extending slantwise with tilted an angle θ2 in relation to the bottom or lower surface 18. Forward and aft ends 23 of the guideway member 2 stand up in perpendicular to the lower surface 9. The wedge guideway member 2 for the vertical guide unit 1 is made with a threaded hole 15, which is used to fasten directly the guideway member 2 against any machine bed 30.

The slider 3 is made concave at widthwise middle thereof to form a recess 19, which is defined by sidewise opposite wings 56 that are made on their widthwise opposing inside surfaces with the second raceway grooves 7, one to each inside surface. Thus, the slider 3 fits over and conforms the guideway member 2 for linear movement relatively to the guideway member 2 so as to go up and down as the guideway member 2 moves in and out the horizontal direction. Although but only one slider 3 is shown coming into sliding engagement with the slant upper surface 8 of the guideway member 2 in the illustrative embodiment, it will be appreciated that any number of the slider 3 may be used. Moreover, the slider 3 has a bolt hole 14, which is used to fasten any of worktable, instrument, work piece, and so on to the slider 3.

Figure 2:
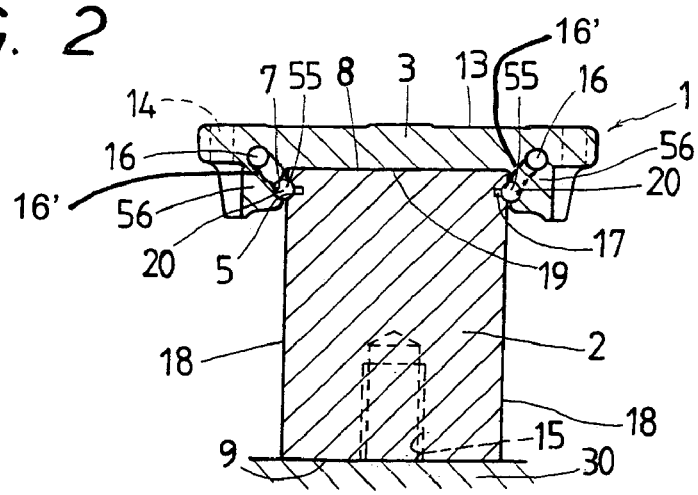
FIG. 2 is a crosswise sectioned view showing the vertical guide unit of FIG. 1, the view being taken along the plane lying on the line I—I of that figure.

The guideway member 2 has either a substantially rectangular configuration as shown in FIG. 2 or a substantially I-shape extended sidewise at both the upper surface 8 and the lower surface 9 as will be shown later in FIG. 3, when taken along any crosswise direction normal to the longitudinal direction. In either event, it will be noted that the guideway member 2 would not be limited to any specific cross-sectional shape as long as the sides 18 could afford to cut the first raceway grooves 5 therein.

Figure 3:
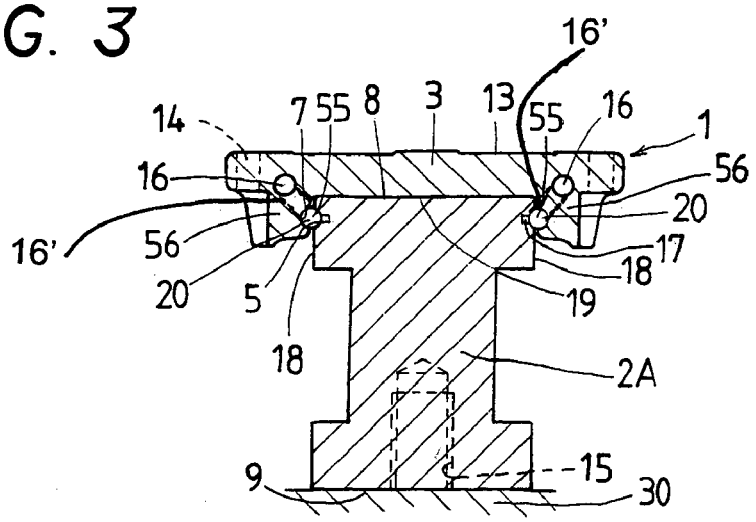
FIG. 3 is a crosswise sectioned view showing another embodiment of the vertical guide unit according to the present invention, the view being taken along a plane corresponding to the plane lying on the line I—I of FIG. 1.

The number of the slider 3 fitting over the upper surface 8 of the guideway member 2 for relatively sliding movement is not limited to just one as shown in, for example FIGS. 1 to 3, but any number of the slider 3, although not shown, are allowed to fit over the upper surface 8.

Figure 11:
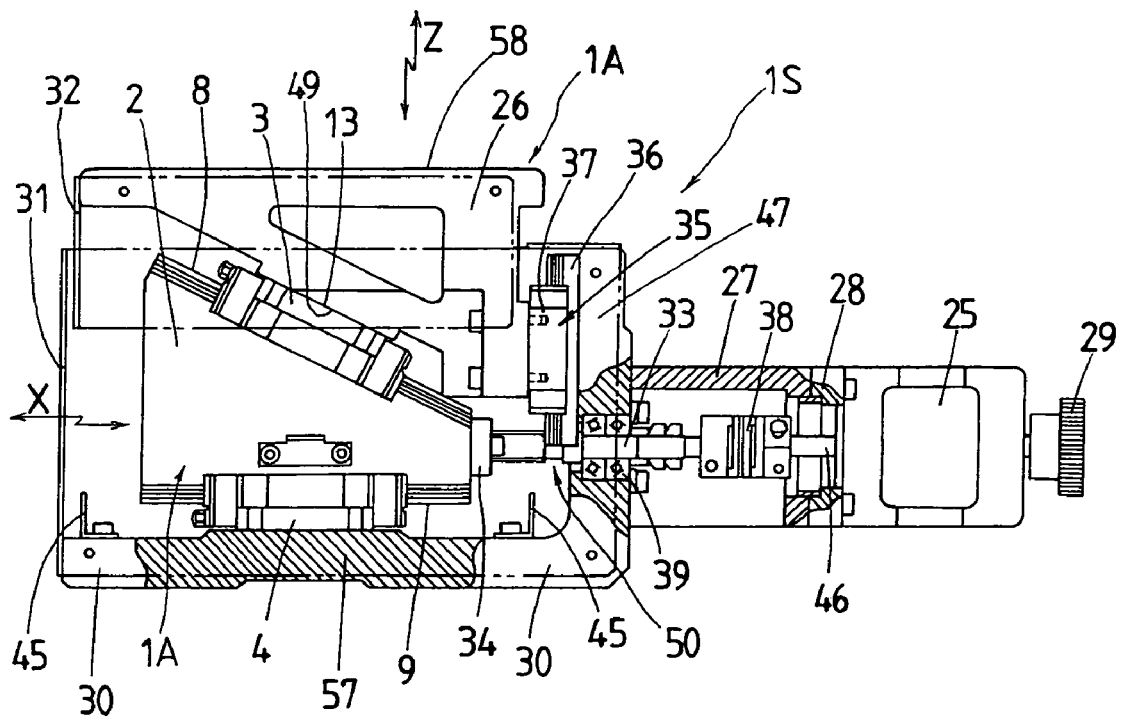
FIG. 11 is a front elevation, partially in section and partially broken away, illustrating the Z stage of FIG. 8, but in which a front cover is removed to reveal the interior thereof.
Figure 12:
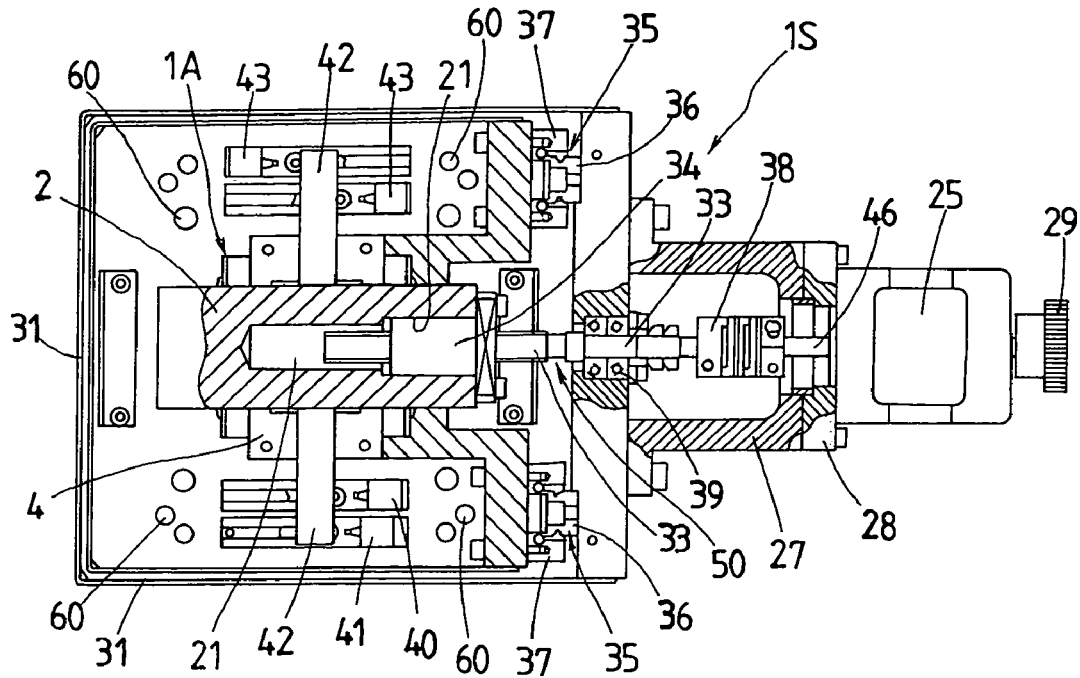
FIG. 12 is a top plan view, partially in section and partially broken away, showing the Z stage of FIG. 9, but in which a top cover is removed to reveal as seen looking into the interior thereof.
Figure 13:
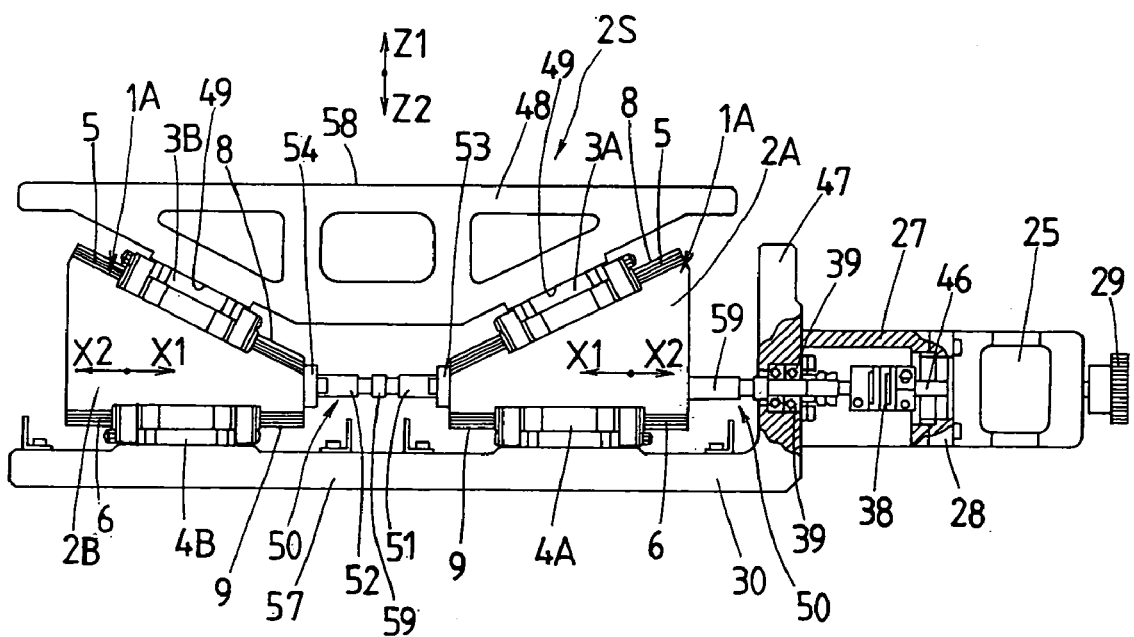
FIG. 13 is a schematic front elevation, partially broken away, showing another embodiment of the Z stage having aboard the vertical guide unit of the present invention.

Overall, the slider 3, as shown in FIG. 1, is made in the form of a substantially rectangular configuration having a top face 13 extending in parallel with the upper surface 8 of the guideway member 2 to provide a mounting surface on which is carried a carriage of any instrument and the like. As an alternative, the slider 3, although not shown, may be entirely made in the form of wedge in which the top face 13 of the slider 3 extends in parallel with the horizontal lower surface 9 of the guideway member 2. The guideway member 2 can be either mounted directly to the stationary base such as a machine bed 30 as shown in FIGS. 1 to 3 or carried on the stationary base such as the machine bed 30 through a bearing 39 as shown in FIG. 11 or 13, which will be referred later.

Referring now to FIGS. 4 to 7, there is shown an alternative embodiment of the vertical guide unit according to the present invention.

With an alternative vertical guide unit 1A, a guideway member 2 is made with two raceway groove pairs 5, 6, which are cut directly in the sidewise opposing sides 18 of the guideway member 2, with one pair of the raceway grooves extending along a slantwise upper surface 8 and the other pair extending along a horizontal lower surface 9. Correspondingly, there are provided an upper slider 3 movable along the slantwise upper surface 8 and a lower slider 4 movable along the horizontal lower surface 9. It will be understood that the upper slider 3 fit over the guideway member 2 can go up and down when moving in a sliding manner relatively to the guideway member 2. Moreover the modified vertical guide unit 1A has an opening 21 in the guideway member 2, which is used to accommodate therein an actuator to force in and out the guideway member 2.

Figure 5:
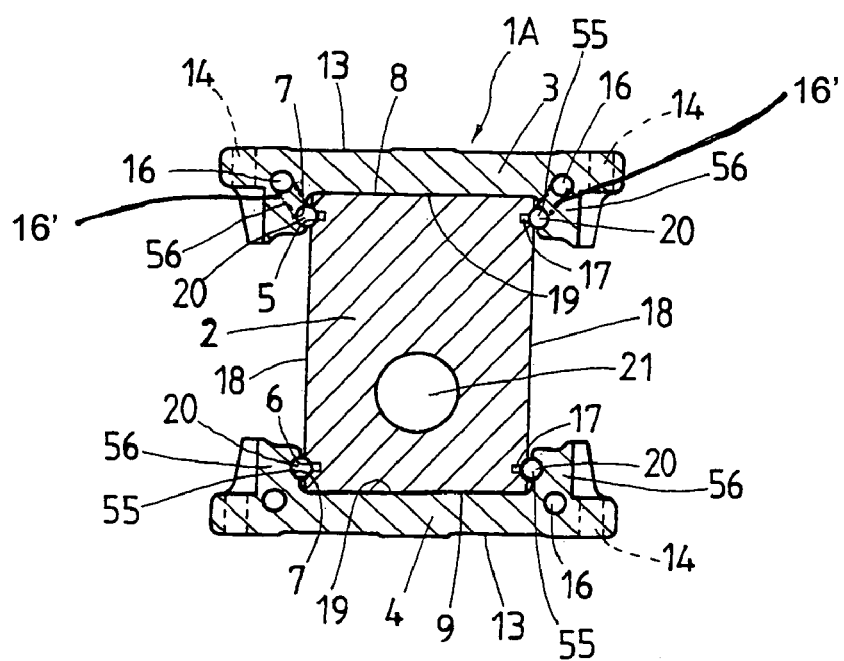
FIG. 5 is a crosswise sectioned view showing the vertical guide unit of FIG. 4, the view being taken along the plane lying on the line II—II of that figure.

The guideway member 2, as shown in FIG. 5, has a substantially rectangular configuration when taken along any crosswise direction normal to the longitudinal direction. The upper slider 3 fits over the upper surface 8 of the guideway member 2 for movement in sliding manner relative to the guideway member 2 while the lower slider 4 conforms to the lower surface 9 of the guideway member 2 for sliding movement. As an alternative, the guideway member 2, although not shown, may be made in a substantially I-shape extended sidewise at both the upper surface 8 and the lower surface 9 as shown in FIG. 3 when taken along any crosswise direction normal to the longitudinal direction. The numbers of the slider 3 fitting over the upper surface 8 of the guideway member 2 and the lower slider 4 conforming to the lower surface 9 of the guideway member 2 for relatively sliding movement are not limited to just one respectively as shown, but it will be appreciated that any numbers of the sliders 3 and 4 may be used to fit over the upper surface 8 and the lower surface 9 of the guideway member 2 respectively.

With the modified vertical guide unit 1A, among a slope θ1 included between the upper surface 8 and the horizontal lower surface 9, a slope θ2 between the slantwise raceway groove 5 and the lower surface 9 and a slope θ3 between the slantwise raceway groove 5 and the horizontal raceway groove 6, there is an equation of angle $\theta = \theta_1 = \theta_2 = \theta_3$.

In particular, although the angle θ or the slope θ3 included between the slantwise raceway groove 5 and the lower surface 9 needs to be determined that a travel amount in the X-direction or horizontal direction of the guideway member 2 is integral times of an amount of vertical displacement in the Z-direction, it would be preferred that arc tangent of the angle θ is equal to ½ or ¼ for better position-control when a stepping motor is selected for driving means of a motor 25 recited later. Moreover considering any load of the instrument itself mounted on the upper slider 3, it would be more preferable to select the angle θ where the arc tangent thereof is a matter of ½ for making certain of smooth sliding travel of the upper slider 3 relative to the guideway member 2.

Where the travel amount in horizontal direction of the guideway member 2 is determined depending on the desired vertical displacement of the slider 3, the vertical position-control will be easily carried out with precision even if the height is any integral times of the lower surface just as the arc tangent θ is equal to ⅓. When considering the need to allow for resolution of the stepping motor selected for the driving source, nevertheless, there would be still a problem of indivisible into any integral. That is to say, whenever the travel amount in the horizontal X-direction of the wedge guideway member 2 is any integral times of the height displacement in the Z-direction of the upper slider 3, the desired position-control in the Z-direction will be realized easily with precision.

What the arc tangent θ is equal to 1 means the slope θ is 45 deg. But if considering the load applied with the slider 3 itself and any member mounted on there, this tilt would need large driving force to actuate the guideway member 2, so the greater the load applied to the motor 25, the bulkier the driving means to force the guideway member 2. It is most preferable that arc tangent of the slope θ is equal to a matter of ¼ to make sure of precise position-control in vertical direction of the slider 3. That is, where the arc tangent of the slope θ is just ¼, the travel in the Z-direction of the slider 3 would be limited to less amount compared with the slope θ where the arc tangent thereof is ½. But the slider 3 can be moved up and down in vertical position in greater detail, so that the vertical position of the slider 3 relative to the guideway member 2 may be advantageously determined with more accuracy.

Where the slope θ is selected such that the arc tangent is equal to ⅕, the guideway member 2 has to be forced in the X-direction over a much longer distance in order to ensure a desired amount of travel in the Z-direction of the slider 3. Thus, this would create a collateral problem making the stage system itself bulky in dimension.

With the alternative vertical guide unit 1A, the sliders 3, 4 are each comprised of a carriage 10, end caps 11 attached to forward and aft ends of the carriage 10, one to each end, and end seals 12 covering over outside ends of the end caps 11. The carriage 10 is recessed at 19 to allow the carriage 10 to fit over or conform to the guideway member 2, and provided on widthwise opposing insides with raceway grooves 7 open to the recess 19 and also made therein with return passages 16 extending in parallel with the raceway grooves 7 to form non-loaded areas allowing the rolling elements 20 to run through there. The end caps 11 are each made therein with turnarounds 16' which connect to return passage 16 to form non-loaded areas allowing the rolling elements 20 to turn over through there. Thus, more than one rolling element 20 is allowed to roll through a recirculating circuit that consists of a load area of the raceway 55 defined between the raceway groove 5(6) on the guideway member 2 and the raceway groove 7 on the carriage 10, and a non-loaded area including the turnarounds in the end caps 11 and the return passage 16 passing lengthwise through the carriage 10.

Figure 4:
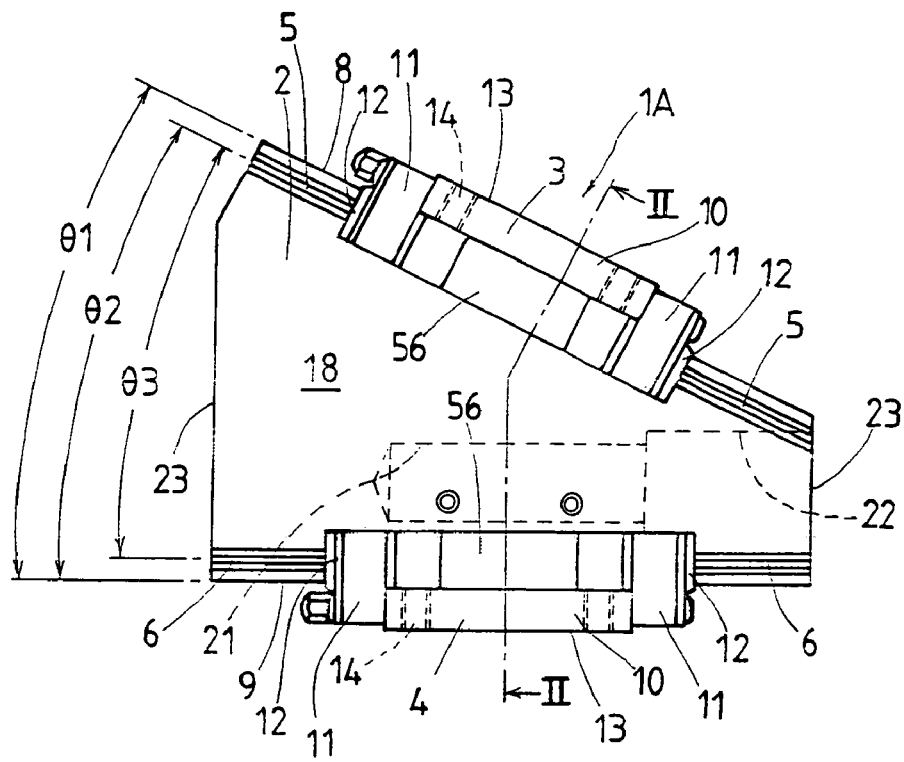
FIG. 4 is a front elevation showing a further another embodiment of the vertical guide unit according to the present invention.

Referring next to FIGS. 8 to 12, there is illustrated a preferred embodiment of a stage system with onboard vertical guide unit constructed as recited in the embodiments in FIGS. 4 and 5.

A stage system 1S having built therein with the vertical guide unit 1A includes a stationary bed 30 on which is secured the lower slider 4 that makes engagement with the lower surface 9 of the guideway member 2 in a way allowed to slide relatively to the guideway member 2, a table 26 lying above the bed 30 to go up and down in vertical or Z-direction with respect to the bed 30 and having the upper slider 3 that comes into engagement with the upper surface 8 of the guideway member 2 for sliding movement relative to the guideway member 2, and an actuator to get the guideway member 2 going in and out in a sliding manner relatively to the upper and lower sliders 3, 4 to force up and down the table 26 in the Z-direction. The table 26 is made in a wedge configuration, which is defined by a lower surface 49 made slantwise in conformity with an upper surface 13 of the slider 3 and a top surface 58 extending in the horizontal. The table 26 is mounted on and fastened to the upper surface 13 of the upper slider 3.

With the stage system 1S constructed as stated earlier, the bed 30 is opened sidewise and surrounded with a side cover 31 while the table 26 is concealed with an enclosure 32, which surrounds over the side cover 31. The bed 30 has various sensors including an origin sensor 40, a before-the-origin sensor 41, a stopper 45, and a limit switch 43 to sense information of any relative position of the guideway member 2 to the bed 30. The information is applied to a controller to adjust the movement of the guideway member 2 relative to the bed 30, depending on signals sent out of the sensors. Moreover, the guideway member 2 has a shielding plate 42 in opposition to the sensors.

Figure 6:
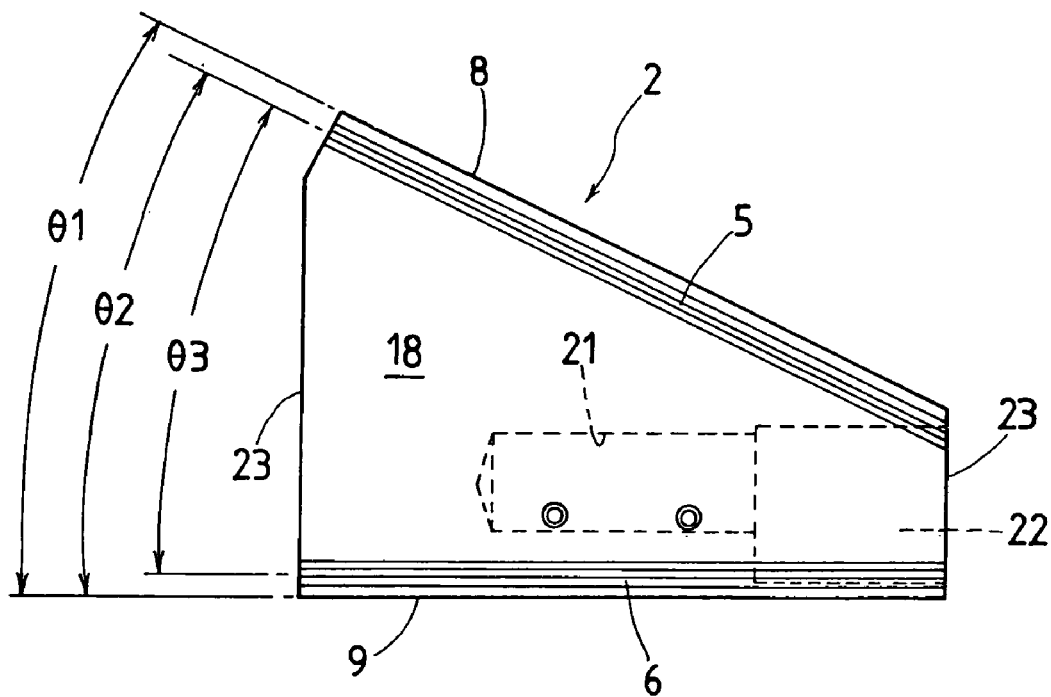
FIG. 6 is a front elevation showing a wedge guideway member for the vertical guide unit of FIG. 4.
Figure 7:
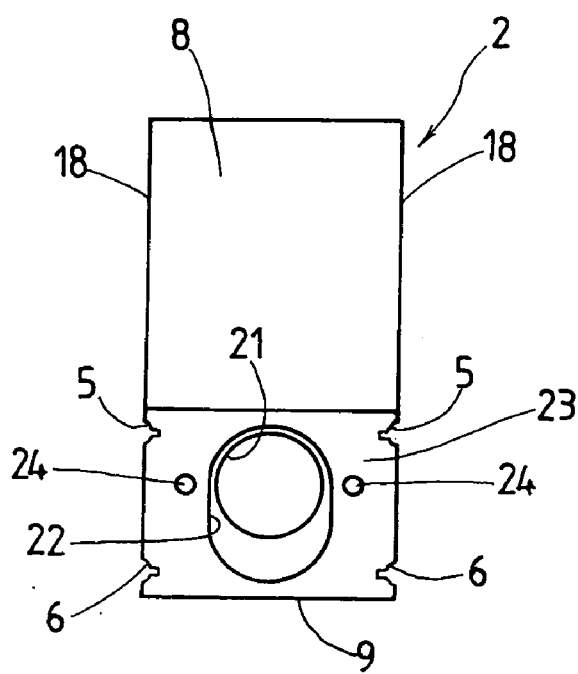
FIG. 7 is a side elevation of the wedge guideway member of FIG. 6.
Figure 8:
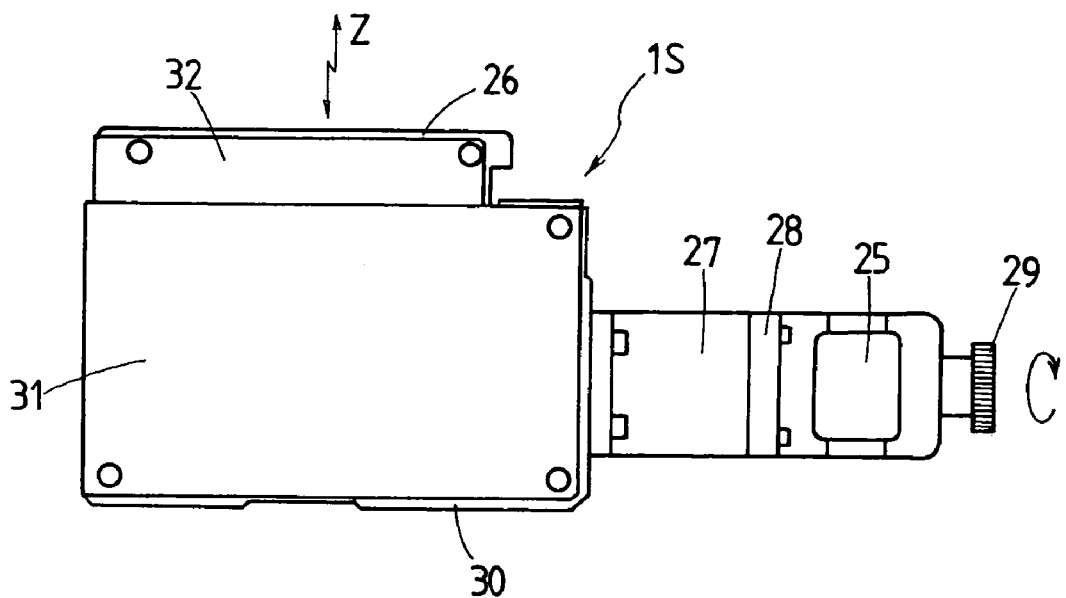
FIG. 8 is a front elevation showing a preferred embodiment of a Z stage system having aboard the vertical guide unit according to the present invention.
Figure 9:
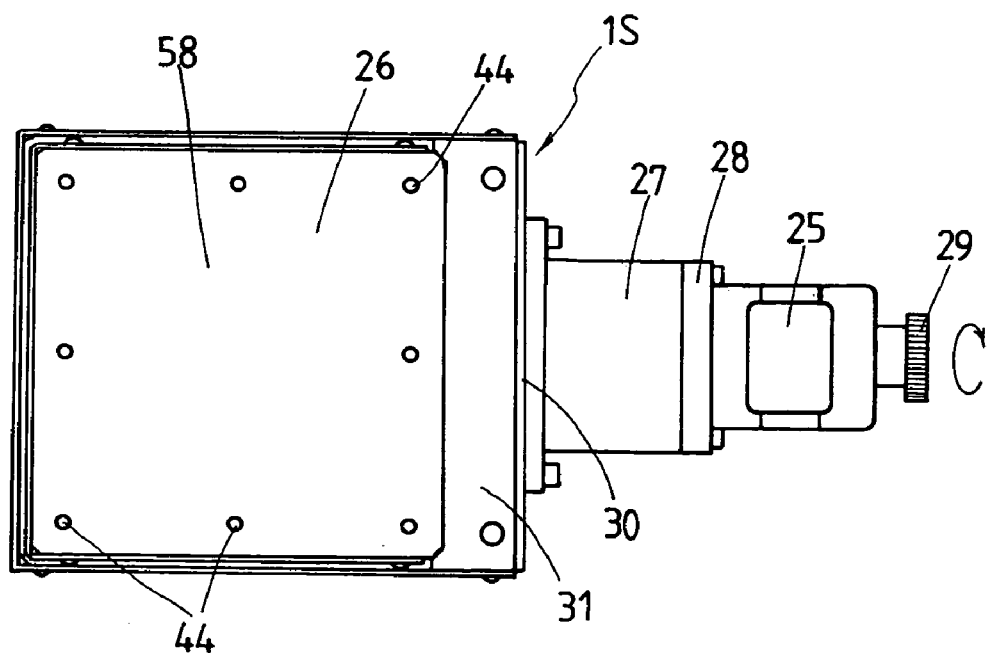
FIG. 9 is a top plan view of the Z stage of FIG. 8.
Figure 10:
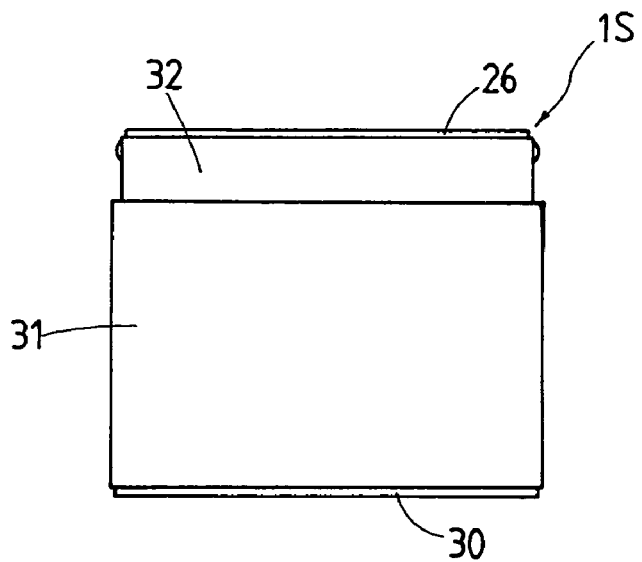
FIG. 10 is a side elevation of the Z stage shown in FIG. 8.

The actuator is accommodated in an enlarged counterbore 22 communicating to the opening 21 cut in the guideway member 2 as shown in FIGS. 6 and 7. The actuator is comprised of a lead nut 34 installed in the counterbore 22 with using screws that fit into threaded holes 24 in any one of forward and aft ends 23 of the guideway member 2, a ball screw 33 mating with the lead nut 34 and carried for rotation on the bed 30 through a bearing 39, and a driving means to turn the ball screw 33 in reversible manner.

Either a motor 25 or a manually manipulated knob 29 can actuate the driving means. The ball screw 33 is connected to an output shaft 46 through a shaft coupling 38. The motor 25, which is a stepping motor in the embodiment discussed here, is fastened via an attachment 28 to a motor bracket 27, which is secured to a side wall 47 integral with the bed 30.

The stationary bed 30 includes at least a bottom block 57 to support the lower slider 4 thereon against movement, and the side wall 47 on which the ball screw 33 is carried for rotation through the bearing 39. Between the side wall 47 of the bed 30 and the table 26 is disposed a linear motion guide unit 35, with a track rail 36 being fastened to the side wall 47 while a slider 37 being secured to the table 26 in a way fitting over the track rail 36 for vertical movement relatively to the track rail 36 whereby the table 26 is ensured to go smoothly up and down as the slider 37 moves along the track rail 36. It will be understood as an alternative, although not shown, that the track rail 36 is fastened to the table 26 while the slider 37 is secured to the side wall 47.

The table 26 is made with threaded holes 44 that are used to fasten any work thereto while the bed 30 has bolt holes 60 to mount the bed 30 on any X-Y stage system. With the stage system 1S recited earlier, the table 26 in itself is made in a wedge configuration that has the top surface 58 lying in parallel with the bed 30 to provide a support surface used to mount any instruments on there, and a slope extending slantwise at an angle conforming to the guideway member 2.

Although but the stage system of the present invention is shown in illustrative embodiment in FIG. 11 as the stage system 1S having aboard just one vertical guide unit 1A, it will be appreciated that any number of the vertical guide unit 1A may be built in to provide a stage system 2S as shown in FIG. 13, in which many vertical guide units 1A lie horizontally along the X-direction to get the table 26 going up and down.

In the stage system 2S, more than one vertical guide unit 1A is arranged in a row in a way opposed to one another at their forward and aft ends. This arrangement makes certain of the most compact or slim construction where both the track rail 36 and the slider 37 of the linear motion guide unit 35 may be made unnecessary, with even larger load being allowed to rest upon the table 48.

With the stage system 2S shown in FIG. 13, the vertical guide units 1A are placed on the bed 30 in bilateral symmetry where any one of the lead nuts 53 and 54, one for left hand screw, the other for right hand screw, is associated with any one of wedge guideway members 2A and 2B. There is provided a ball screw 59 around which left hand and right hand screws 51 and 52 are cut in axially opposite relation to one another to mate with their conformable lead nuts 53 and 54. In the stage system 2S, especially, the guideway member 2 is made up of the first guideway member 2A and the second guideway member 2B, which are identical with each other in slope of the upper surface 8 and are arranged in opposed relation to one another in the fore-and-aft direction.

The stage system 2S includes a stationary bed 30 on which is secured both a first lower slider 4A that makes engagement with a lower surface 9 of the first guideway member 2A in a way allowed to slide relatively to the guideway member 2A and a second lower slider 4B making engagement with a lower surface 9 of the second guideway member 2B in a way allowed to slide relatively to the guideway member 2B, a table 48 lying above the bed 30 to go up and down in vertical or Z-direction with respect to the bed 30 and having both a first upper slider 3A that comes into engagement with an upper surface 8 of the guideway member 2A for sliding movement relative to the guideway member 2A and a second upper slider 3B that comes into engagement with an upper surface 8 of the guideway member 2B for sliding movement relative to the guideway member 2B, and an actuator to get the guideway members 2A and 2B going in and out in opposite directions to one another to force up and down the table 48 in the Z-direction.

Turning an output shaft 46 by either a motor 25 or a manually manipulated knob 29 to actuate a pair of the vertical guide units 1A causes simultaneous movement of the wedge guideway members 2A, 2B in directions X1 and X2 opposite to one another along X-axis so as to move either toward or away from each other, whereby the table 48 integral with the paired upper sliders 3A, 3B goes up and down in either one of Z1 and Z2 directions along Z-axis.

The actuator in the stage system 2S is composed of a lead nut-and-ball screw arrangement 50 including the first lead nut 53 installed in a hole 21 made in the first guideway member 2A, the second lead nut 54 fit in a hole 21 made in the second guideway member 2B, and a ball shaft 59 mating with the first and second lead nuts 53 and 54, with being carried for rotation on a side wall 47 of the bed 30, and a driving means to turn the lead shaft 59 in reversible manner.

The lead nut-and-ball screw arrangement 50 is composed of the first lead nut 53 cut with either of right hand screw and left hand screw and joined with the first guideway member 2A, the second lead nut 53 cut with the other of right hand screw and left hand screw and joined with the second guideway member 2B, and the ball shaft 59 around which an external thread is cut helically to mate with the first and second lead nuts 53, 54. That is to say, the ball shaft 59 is made up of a first ball screw portion made with either of right hand screw and left hand screw, and a second ball screw portion made with the other of right hand screw and left hand screw. The ball shaft 33 is moreover connected through a shaft coupling 38 to an output shaft 46 that is jointed to the motor 25 and the manually manipulated knob 29 to drive the ball shaft 33.

While the present invention has been disclosed in connection with the preferred embodiments thereof, it should be understood that other embodiments might be fall within the spirit and scope of the invention, as defined by the following claims.

What is claimed is:

1. A vertical guide unit comprising;
a guideway member made on a wedge that has an upper surface and a lower surface, the upper surface slanting down toward the lower surface;
wherein the guideway member has two pairs of raceway grooves on opposite sides of the guideway member;
a first pair of the raceway grooves, wherein the length of the first pair of raceway grooves extend along the upper surface and slant downward toward the lower surface and a second pair of raceway grooves extending along the lower surface;
a first slider movable along the upper surface and a second slider movable along the lower surface;
wherein the first slider moves up and down relative to the second slider when moving in a sliding manner on the guideway member;
wherein at least the first slider comprises a carriage having end caps respectively attached to forward and aft ends of the carriage;
wherein the carriage has a recess engaged over the upper surface of the guideway member;
wherein opposing sides of the recess have a third pair of raceway grooves respectively corresponding to the first pair of raceway grooves to form a pair of raceway passages (55) on opposite sides of the guideway member which slant downward toward the lower surface;
wherein at least one rolling element runs through each of the raceway passages and a turnaround passage 16' in each of the end caps into a return passage 16 provided in the first slider.

2. The vertical guide unit constructed as defined in claim 1, wherein any number of the slider rides on the upper surface and the lower surface of the guideway member, respectively.

3. The vertical guide unit constructed as defined in claim 1, wherein an arc tangent of a slope angle included between the lower surface and the first raceway grooves on the sides of the guideway member is equal to either ½ or ¼.

4. The vertical guide unit constructed as defined in claim 1, wherein the guideway member is either a substantially rectangular configuration or a substantially I-shape extended sidewise at both the upper surface and the lower surface, when taken along any crosswise direction normal to the longitudinal direction, and the upper slider fits over the upper surface of the guideway member for sliding movement relatively to the guideway member while the lower slider conforms to the lower surface of the guideway member for relatively sliding movement.

5. The vertical guide as defined in claim 1, wherein the second slider is identical to the first slider.

* * * * *